April 21, 1953    J. V. CAPUTO    2,636,140
HOMOPOLAR GENERATOR
Filed Nov. 5, 1948    4 Sheets-Sheet 1
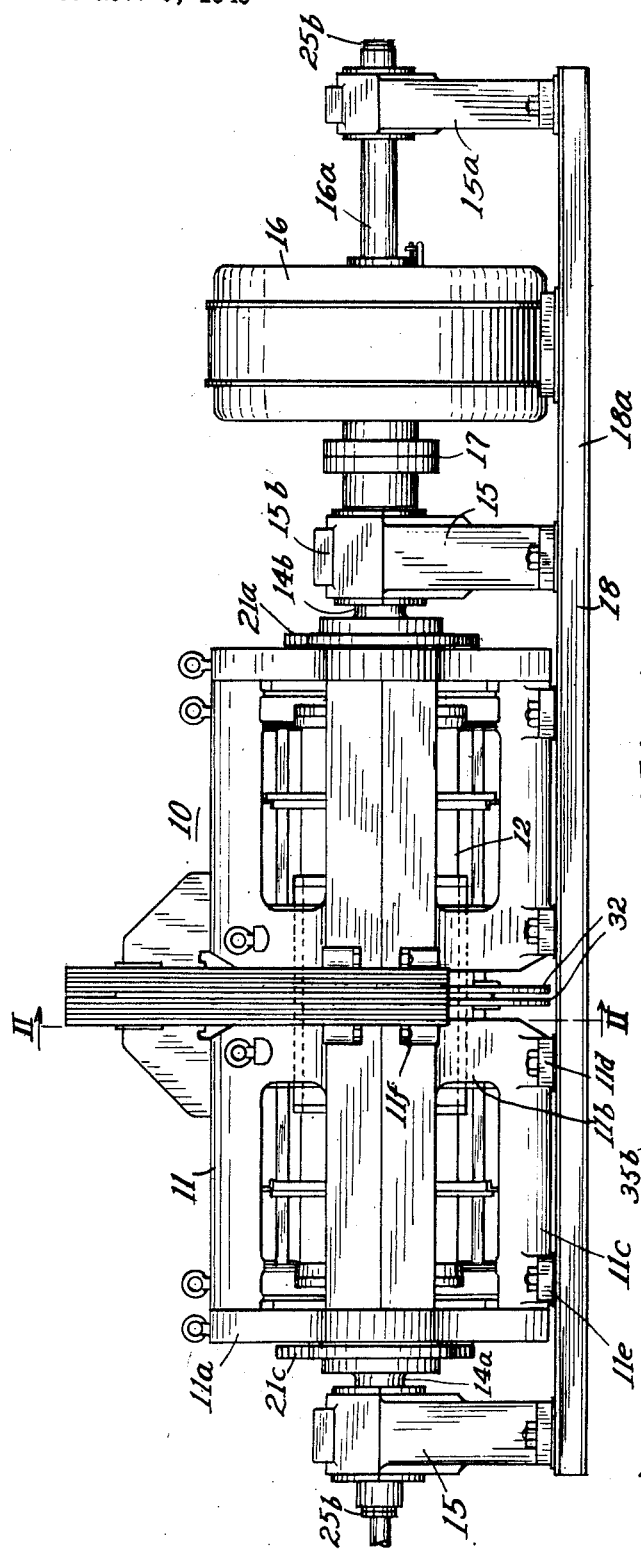
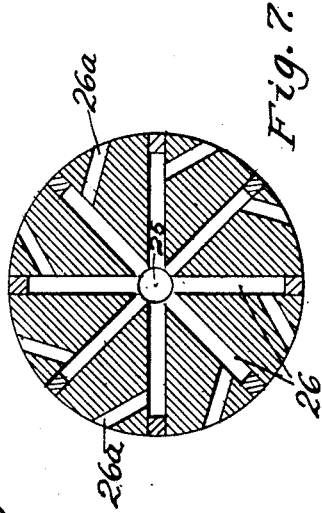
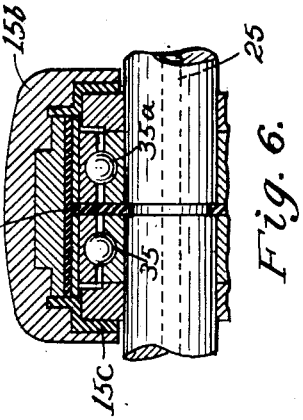
Inventor
James V. Caputo
By Christy, Pennewin &
Strickland
Attorneys Inventor
James V. Caputo April 21, 1953  J. V. CAPUTO  2,636,140
HOMOPOLAR GENERATOR Filed Nov. 5, 1948  4 Sheets-Sheet 4

Inventor
James V. Caputo
By Christy, Parmelee & Strickland
Attorneys

Patented Apr. 21, 1953

2,636,140

UNITED STATES PATENT OFFICE 2,636,140

HOMOPOLAR GENERATOR

James V. Caputo, Youngstown, Ohio

Application November 5, 1948, Serial No. 58,627

7 Claims. (Cl. 310—178)

This invention relates to homopolar generators and, in particular, to a generator adapted to supply loads demanding currents of great magnitude over prolonged periods, at high efficiency.

Homopolar generators are well known to be inherently suited for supplying heavy currents at low voltage. Such currents are required in certain industrial applications such as welding, electrolytic processes, etc. In generators of large capacity, serious problems are encountered by reason of the very magnitude of the current and particularly the intense heating and magnetic effects caused thereby, and the result is that the efficiency is not very high. It is accordingly the object of my invention to improve generally on homopolar generators as heretofore constructed and to provide a generator of large capacity and high efficiency with a terminal assembly which largely neutralizes the magnetic effects of the load current and with special cooling arrangements whereby overheating is prevented. A further object is to provide a generator having certain novel features of construction which aid the attainment of the principal object, facilitate manufacture at reasonable cost, and insure low maintenance in operation. These features concern particularly the field structure, the brush rigging, and certain details of the construction of the rotor of the generator.

A complete understanding of the invention may be obtained from the following detailed description and explanation which refer to the accompanying drawings illustrating the present preferred embodiment. In the drawings:

Fig. 1 is a side elevation of my improved generator and its driving motor with parts omitted;

Fig. 3A shows a portion of Fig. 3 to enlarged scale;

Fig. 6 is a partial vertical central section through the bearing common to the motor and generator;

Fig. 7 is a section through the rotor only, taken along the plane of line VII—VII of Fig. 3; and Fig. 8 is a partial section showing a modified construction of a portion of the rotor.

Figure 2:
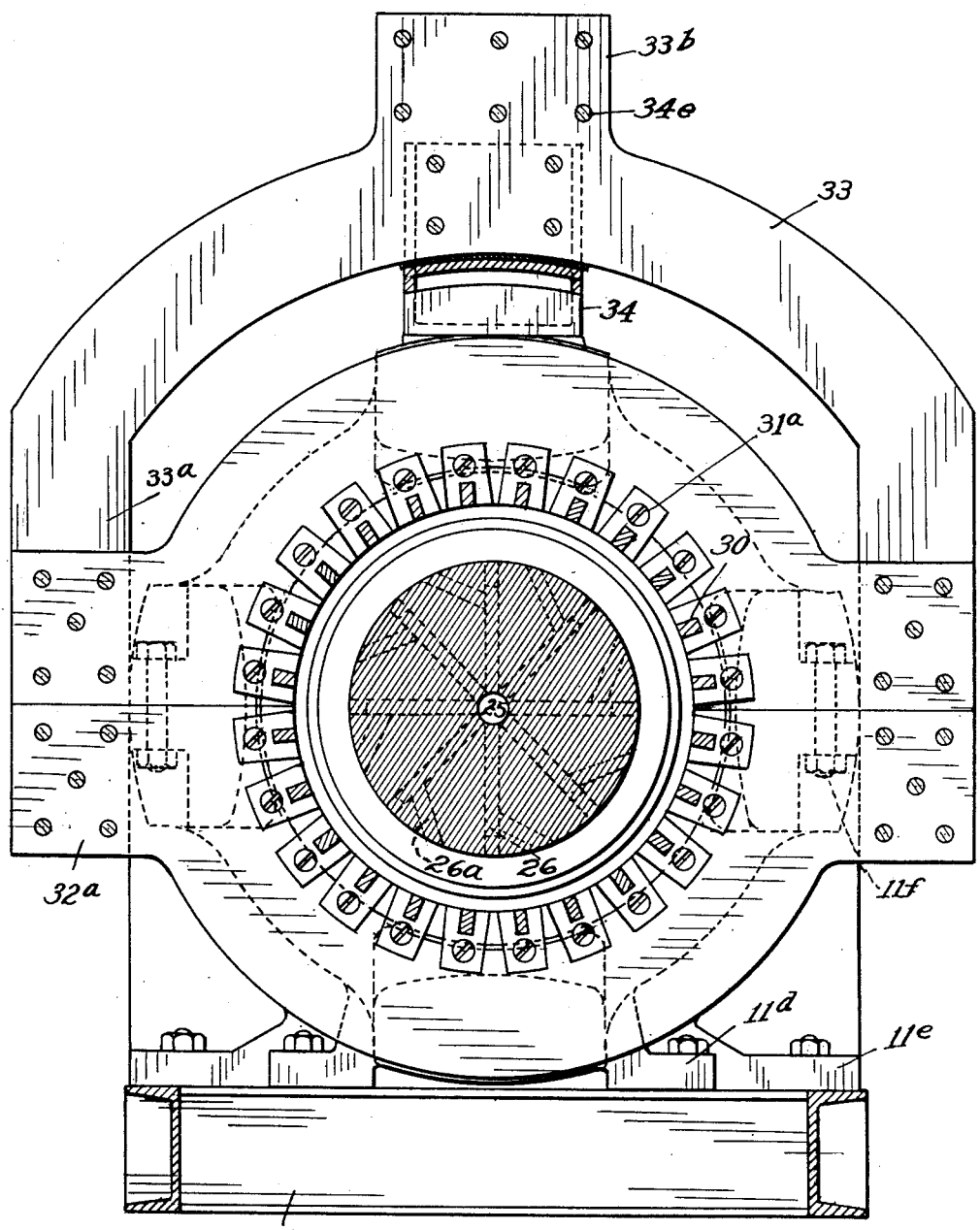
Fig. 2 is a transverse section therethrough taken along the plane of line II—II of Fig. 1.

Referring now in detail to the drawings, and, for the present, to Figs. 1 and 2, my improved generator indicated generally at 10 includes a field structure 11 and a rotor 12 therein having shaft extensions 14a and 14b at its ends journaled in bearings 15. The extensions are of non-magnetic metal such as stainless steel to reduce the stray flux and limit the induced current. The rotor is driven by a motor 16 through a coupling 17. A bearing 15a supports the outer end of the motor shaft 16a. The motor, generator and bearings are mounted on a common base 18 fabricated from longitudinal and transverse structural members 18a and 18b, respectively. The generator is symmetrical about its median transverse plane so that only one end thereof will be described, but it will be understood that the structure thereof is duplicated on the other side of said plane.

Figure 3:
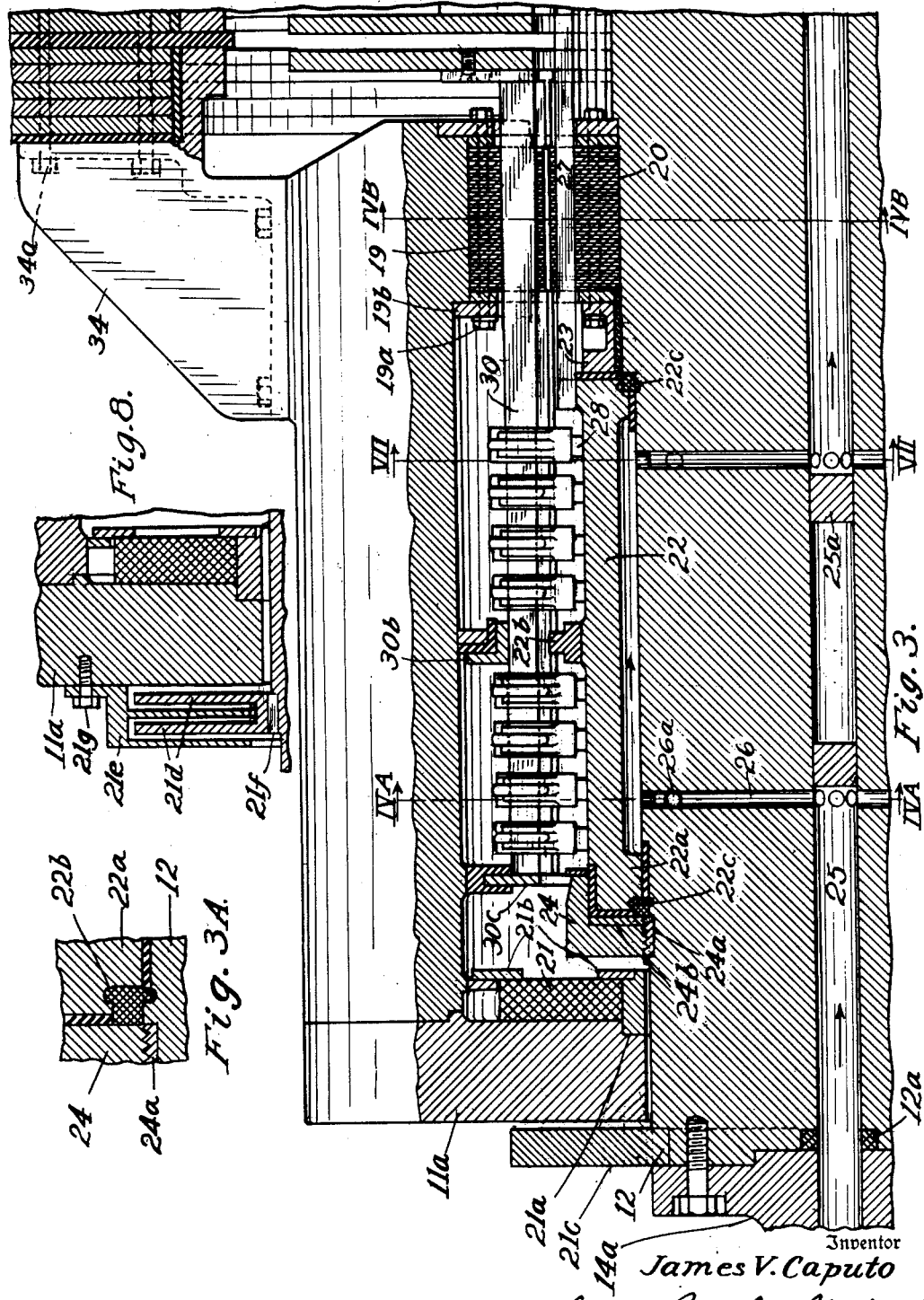
Fig. 3 is a partial vertical axial section showing portions of the field structure, rotor, collector sleeve and brush rigging.

The field structure 11 is a cage composed of spaced end rings 11a and 11b connected by transoms 11c spaced circumferentially thereof. The transoms are integral with ring 11b. Ring 11a is unitary, but the remainder of the cage is divided on a horizontal plane, the two portions being secured together by bolts 11f. The lower half of the structure is provided with inner and outer feet 11d and 11e respectively, bolted to the base 18. An annular laminated stator ring or core 19 is embraced by the halves of end ring 11b, being secured thereto by through bolts 19a and clamping rings 19b as shown in Fig. 3.

The rotor 12 extends through close-fitting openings in the end rings 11a and is provided with a laminated annular core 20 spaced therealong for cooperation with the core 19, respectively. The core 20 is provided with through bolts and clamping rings in the same manner as the rings 19. The clamping rings are insulated from the rotor to prevent local currents from circulating through the bolts. A magnetic circuit for each end of the generator is thus afforded by cores 19 and 20, rotor 12, end ring 11a and transoms 11c. The air gaps between the cores 19 and 20 and between end ring 11a and rotor 12 should be kept as small as possible. An exciting winding 21 is mounted adjacent each end ring 11a coaxially of the rotor, being supported on an internal pole-shoe ring 21a seated in the end ring, and secured in position by keeper rings 21b. An external pole-shoe disc 21c is mounted on the end of the rotor adjacent the end ring 11a. The end of the rotor is turned down slightly to form a shoulder against which the disc abuts, and the disc is held in place on the rotor by shaft extension 14c. The ring 21a and disc 21c serve as pole shoes to afford increased air gap area, permitting spreading of the flux and reduction of the density thereof in the air gap, as well as reducing the ampere turns required and the leakage flux.

The rotor 12 is provided with collector sleeves 22, preferably of copper, one adjacent each end thereof. As shown in Fig. 3, the sleeves 22 are recessed on the interior thereof, leaving inner bearing portions 22a at each end. These portions rest on insulating bushings. A binding ring 22b shrunk on the collector sleeve prevents outward bowing of its mid-portion as a result of centrifugal force. A spacer ring 23 is disposed between the inner end of the collector sleeve and the laminated core 20 and is insulated from the sleeve and rotor proper by a ring and bushing of insulation. The collector sleeve is held in place by a flanged collar 24 engaging the outer end but insulated therefrom. The collar is turned on a threaded split ring 24a fitting in a circumferential groove in the rotor. It positions not only the collector sleeve but also the core 20 by applying pressure to the spacer ring 23. A washer 24b is disposed between the collar and the sleeve. The collector sleeve has grooves on the interior at each end and cooperating grooves are formed in the rotor. Sealing rings 22c are fitted in these grooves for a purpose which will appear shortly. The sealing rings are compressed as the collar 24 is turned home to seat the collector sleeve firmly against the spacer ring 23.

Figure 4:
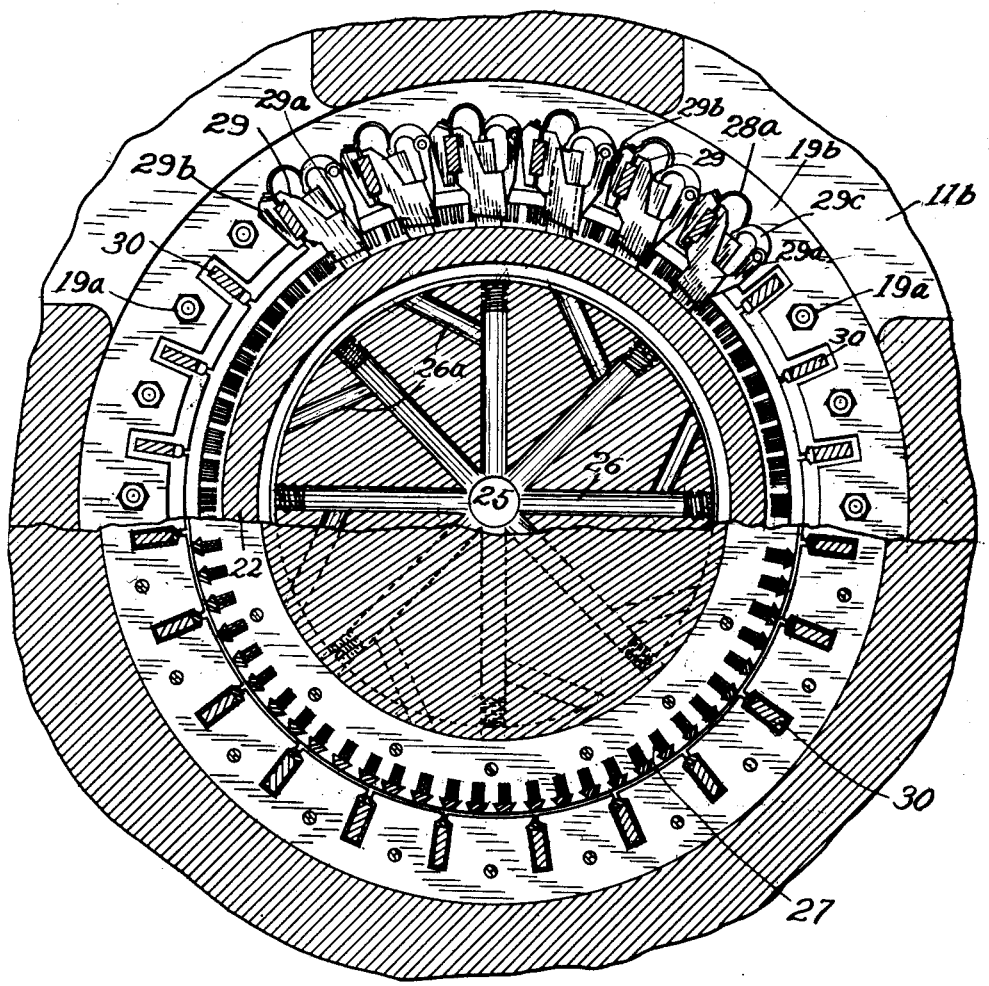
Fig. 4 is a composite sectional view, the upper half being taken along the plane of line IVA—IVA and the lower half along the plane of line IVB—IVB of Fig. 3.

The rotor 12 and shaft extensions 14a and 14b are drilled axially to provide a passage 25 for cooling water. Radial passages 26 intersecting passage 25 are drilled in the rotor at transverse planes spaced therealong within the limits of the recess on the interior of the collector sleeve. Plugs 25a close the passage 25 between the groups of radial passages whereby cooling water admitted to one of the shaft extensions of the rotor flows through passage 25 then outwardly through one group of radial passages to the interior of the collector sleeve and back through the other group of radial passages. The sealing rings 22b prevent leakage of the cooling water. Similar rings 12a are provided between the rotor and shaft extensions. For improved cooling of the collector sleeve, passages 26a are drilled in the rotor at an angle to passages 26 and intersecting the latter as shown in Fig. 4. The outer ends of passages 26 are plugged. The inclination of passages 26a to the radii of the rotor creates somewhat the effect of a pump impeller and insures circulation of cooling water around the interior of the collector sleeve. The passages 26a of one group are inclined opposite to those of the other group. Fig. 4 shows, in the upper portion, the passages 26a of the left-hand group of Fig. 3 which are inclined backwardly, considering clockwise rotation of the rotor. Fig. 7 shows the passages of the next group which are inclined forwardly for clockwise rotation. The first group sets up a pressure causing outward flow and the second group a pressure causing inward flow on clockwise rotation. This prevents the pumping forces of the two sets of passages from off-setting each other, and insures a steady pressure head tending to maintain circulation. The passage 25 extends through coupling 17 and the shaft 16a of motor 16. Swivel inlet and outlet connections 25b for cooling water are provided on shaft extension 14a and the outer end of the motor shaft, respectively. The seal rings 22c when compressed by the collars 24, seal both the space between the rotor and the collector sleeve and that between the collector sleeve and the ring 23 and collar 24.

Figure 5:
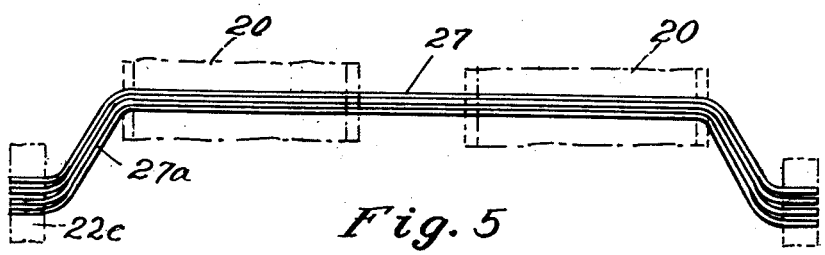
Fig. 5 is a partial plan view of one of the groups of inductors carried by the rotor.

Inductors 27 arranged in groups are embedded in slots in the laminated ring 20. As shown in Fig. 5, the inductors extend through both laminated rings 20 and across the space intervening therebetween. The outer ends of the inductors are sweated into slots in flanges 22c at the inner ends of collector rings 22. The ends of the inductors, however, are offset from the embedded portions thereof and connected thereto by angularly disposed portions 27a, extending circumferentially of the rotor. As a result, current flowing in the inductors aids the magnetization of the rotor and field caused by winding 21. The total effect of all the angularly disposed inductor portions 27a is equal at least to one coil turn around the magnetic circuit. They thus serve the function of a compound winding to increase the field strength with increasing load. Although the magnetic circuits of the two ends of the generator are independent, the magnetization of both is aided by the same current flowing in the inductors.

Current induced in the inductors by their passage through the field maintained in the magnetic circuit is taken off from the collector sleeve by brushes 28 bearing thereon. The brushes are disposed in holders 29 carried on supporting bars 30. The bars 30 extend axially of the rotor and have their inner ends embedded in slots in the laminated ring 19 as shown in Fig. 4. The bars are insulated from the ring and the clamping rings 19b are notched to clear the bars. The embedded portions of the bars form a pole-face winding which counteracts armature reaction, i. e., the tendency of current in the inductors to demagnetize the rotor and field. The bars carry current in a direction opposite that in which it flows in the inductors and being closely adjacent thereto, almost completely neutralize the magnetic effect thereof.

Each brush holder includes a brush guide 29a and a clamping block 29b on opposite sides of the bars 30, and notched to receive the latter. The bearing finger 29c is pivoted on a post extending upwardly from the brush guide which is hollow to accommodate the brush. The finger is actuated by a torsion spring (not shown) and thereby caused to exert pressure on the end of the brush, to seat it firmly against the collector sleeve. A pig-tail 28a extends from each brush to the clamping block of its holder.

The outer ends of the brush-holder bars 30 extend to a ring 30a seated on the transoms 11c inwardly of the field winding 21, but insulated therefrom. A flanged ring 30b embraces the bars intermediate the portions thereof overhanging the collector ring. The ring 30b is also seated on the transoms but insulated therefrom. By this construction, the outer ends of the bars 30 are stayed and braced against deflection and maintained in proper position relative to each other. The inner ends of the bars have terminal blocks 31 thereon.

Two terminal discs 32 located in the space between the laminated rings 19 surround the rotor. As shown in Fig. 2, each disc is divided along a horizontal plane. The terminal blocks 31 on the bars 30 are secured to the discs 32 by screws 31a. The discs 32 thus constitute the current leads of opposite polarity from the generator. Their location in closely spaced side-by-side relation reduces the inductance of the load circuit. In order to maintain substantially uniform distribution of current therein, I provide a pair of lugs 32a on each disc and a plurality of yokes 33 arching over the discs having legs 33a bolted to the lugs. Lugs 33b extend upwardly from the top of the yokes for connection of bus-bars extending to the load. The yokes are supported on brackets 34 bolted to the top transoms 11c, being secured thereto by through bolts 34a suitably insulated as by washers and bushings. As shown in Fig. 3, there are a plurality of yokes for each disc in contact with each other but insulated from the brackets. The two groups of yokes, one connected to each disc, are necessarily insulated from each other as shown. This provides a strong compact terminal assembly having a minimum inductance, affording balanced current distribution and avoiding local overheating.

Fig. 6 shows a feature embodied in the bearing 15 between the motor and generator to prevent pitting of the bearing surfaces by local currents resulting from stray flux. The bearing includes duplicate sets of anti-friction balls and races 35 and 35a, separated by a disc 35b of insulation. Bearing cap 15b is separated from the units of the bearing by a liner of insulation 15c. The bearing is thus electrically separated into two portions, thus preventing the circulation of local currents which would otherwise be induced in the bearings and shaft.

Fig. 8 shows a modification of the pole-shoe disc 21c. The modified form includes interleaved discs 21d and 21e, the former being secured to the rotor 12 by a key 21f, and the latter secured to end ring 11a by screws 21g. It will be evident that this form provides even greater air-gap area than the single pole-shoe disc 21c.

It will be apparent from the foregoing that the improved generator of my invention has numerous advantages over homopolar machines known heretofore. The virtues of the novel terminal assembly have already been mentioned. The low inductance thereof causes the generator current to respond quickly to load changes. The provision for artificial cooling of the collector sleeves reduces the copper loss therein thus increasing efficiency. It also permits the machine to carry overloads without injury, and prevents underload changes. The brush rigging is rigid and firmly braced so as to insure proper alinement thereof at all times. The generator is also characterized by high efficiency, low maintenance, moderate cost, and ease of construction.

Although I have illustrated and described only a preferred embodiment of my invention, it will be recognized that changes in the details thereof may be made without departing from the spirit of the invention or the scope of the appended claims.

I claim:

1. In a homopolar generator, a rotor having inductors thereon and a collector sleeve to which the inductors are connected, said sleeve being recessed interiorly and telescoped on the rotor, a collar engaging one end of said sleeve to hold it on the rotor, and compressible rings sealing the clearance between the other end of the sleeve and the rotor and the joint between the collar and said one end of the sleeve.

2. In a homopolar generator, a field structure and a rotor rotatable therein, said field structure including an end ring in the form of a flat disc having a central opening receiving an end of the rotor, and a pole-shoe ring disposed coaxially of said end ring, with one face abutting thereagainst and extending therefrom along the rotor, providing increased surface area in the air gap between the field and rotor.

3. In a homopolar generator, a field structure and a rotor rotatable therein, said field structure including an end ring in the form of a flat disc having a central opening receiving an end of the rotor, and a pole-shoe disc mounted on said rotor on the outside of said end ring, the outer portion of said pole-shoe disc radially overlapping the inner portion of said end ring.

4. In a homopolar generator, a field structure and a rotor rotatable therein, said field structure including an end ring in the form of a flat disc having a central opening receiving an end of the rotor, pole-shoe discs mounted on said rotor with their free edges extending outwardly therefrom, pole-shoe discs mounted on said field structure with their free edges extending inwardly and radially overlapping the outer edges of the discs mounted on the rotor, the pole-shoe discs of the rotor and field structure being interleaved.

5. A homopolar generator comprising a cylindrical stator core, a shaft extending therethrough, a cylindrical rotor core on said shaft within the stator core, inductors embedded in the rotor core, a collector sleeve telescoped over the end of the shaft outwardly of said rotor core, the inductors being connected to the sleeve, and a clamping collar threaded on said shaft outwardly of said sleeve securing said sleeve in endwise abutment against said rotor core.

6. In a homopolar generator, a field structure including a stator ring core, a shaft extending therethrough and a laminated rotor ring core on said shaft within said stator core, the combination of clamping rings on opposite sides of said rotor ring core, clamping bolts extending through the rotor ring core and its clamping rings and an insulating bushing between the shaft and at least one of the clamping rings of the rotor core, to prevent current from circulating through said bolts.

7. In a homopolar generator including a field structure, a rotor rotatable therein and inductors on the rotor, the improvement comprising a collector sleeve on the rotor to which the inductors are connected, the sleeve being spaced from the rotor at all points therealong between its end portions forming an annular passage in the sleeve extending axially of the rotor, passages in said rotor for circulating cooling fluid through the sleeve passage, the rotor passages including a central longitudinal passage, radial passages branching therefrom at points spaced therealong and additional passages extending inwardly from the periphery of the rotor at an angle to the radial passages and intersecting therewith.

JAMES V. CAPUTO.

References Cited in the file of this patent

UNITED STATES PATENTS

| Number | Name | Date |
|--------|------|------|
| 587,871 | Short | Aug. 10, 1897 |
| 702,658 | Lamme | June 17, 1902 |
| 1,085,316 | Allen | Jan. 27, 1914 |
| 1,150,486 | Bergstrom | Aug. 17, 1915 |
| 1,152,680 | Wieselgreen | Sept. 7, 1915 |
| 1,152,681 | Wieselgreen | Sept. 7, 1915 |
| 1,513,405 | Libby | Oct. 28, 1924 |
| 1,582,712 | Wagner | Apr. 27, 1926 |
| 1,769,063 | Kimman | July 1, 1930 |
| 1,802,110 | Graham | Apr. 21, 1931 |
| 1,837,827 | Munday | Dec. 22, 1931 |
| 1,944,952 | Rouge | Jan. 30, 1934 |
| 1,998,087 | Koch | Apr. 16, 1935 |
| 2,027,607 | McGuire | Jan. 14, 1936 |
| 2,121,593 | Hague et al. | June 21, 1938 |
| 2,134,510 | Hague | Oct. 25, 1938 |
| 2,249,834 | Kreh | July 22, 1941 |
| 2,367,079 | Wiest | Jan. 9, 1945 |

FOREIGN PATENTS

| Number | Country | Date |
|--------|---------|------|
| 24,751 | Great Britain | of 1907 |
| 562,150 | France | Aug. 27, 1923 |